(12) United States Patent
Gerardo Castro et al.

(10) Patent No.: US 11,698,437 B2
(45) Date of Patent: Jul. 11, 2023

(54) SEGMENTATION AND CLASSIFICATION OF POINT CLOUD DATA

(71) Applicant: Ford Global Technologies, LLC, Dearborn, MI (US)

(72) Inventors: Marcos Paul Gerardo Castro, Mountainview, CA (US); Feng Jin, Tucson, AZ (US); Jinesh Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 374 days.

(21) Appl. No.: 17/009,040

(22) Filed: Sep. 1, 2020

(65) Prior Publication Data

US 2022/0065992 A1    Mar. 3, 2022

(51) Int. Cl.
| | |
|---|---|
| G06N 3/04 | (2023.01) |
| G01S 7/41 | (2006.01) |
| G01S 13/42 | (2006.01) |
| G01S 13/931 | (2020.01) |
| G06V 20/56 | (2022.01) |
| G06F 18/213 | (2023.01) |

(52) U.S. Cl.
CPC ............ *G01S 7/412* (2013.01); *G01S 7/417* (2013.01); *G01S 13/42* (2013.01); *G01S 13/931* (2013.01); *G06F 18/213* (2023.01); *G06V 20/56* (2022.01)

(58) Field of Classification Search
CPC ....... G06K 9/629; G01S 17/89; G01S 17/931; G06N 3/08; G06V 10/761; G06T 7/68; G06T 3/00; H04N 21/2353
See application file for complete search history.

(56) References Cited

U.S. PATENT DOCUMENTS

2019/0108447 A1* 4/2019 Kounavis ............... G06V 40/28

FOREIGN PATENT DOCUMENTS

| CN | 106127725 B | 1/2019 |
|---|---|---|
| CN | 109325972 A | 2/2019 |
| DE | 102018203591 B3 | 7/2019 |

OTHER PUBLICATIONS

Danzer et al., "2D Car Detection in Radar Data with PointNets", arXiv:1904.08414v3 [cs.CV] Dec. 2, 2019, © 2019 IEEE, DOI: 10.1109/ITSC.2019.8917000.
Schumann et al., "Semantic Segmentation on Radar Point Clouds" (Abstract Only), 2018 21st International Conference on Information Fusion (Fusion), https://ieeexplore.ieee.org/document/8455344, DOI: 10.23919/ICIF.2018.8455344.

* cited by examiner

*Primary Examiner* — Phuoc H Doan
(74) *Attorney, Agent, or Firm* — Frank A. MacKenzie; Bejin Bieneman PLC (57) ABSTRACT

A system can include a computer including a processor and a memory, the memory storing instructions executable by the processor to receive point cloud data. The instructions further include instructions to generate a plurality of feature maps based on the point cloud data, each feature map of the plurality of feature maps corresponding to a parameter of the point cloud data. The instructions further include instructions to aggregate the plurality of feature maps into an aggregated feature map. The instructions further include instructions to generate, via a feedforward neural network, at least one of a segmentation output or a classification output based on the aggregated feature map.

20 Claims, 7 Drawing Sheets

SEGMENTATION AND CLASSIFICATION OF POINT CLOUD DATA

BACKGROUND

Various sensors can provide data to identify objects in a physical, i.e., real-world, environment around a vehicle. For example, sensors such as video cameras, lidar, radar, ultrasonic sensors, etc. can provide data to identify an object. A vehicle computer can receive the data from the sensors while operating a vehicle in the environment.

DETAILED DESCRIPTION

A system includes a computer including a processor and a memory, the memory storing instructions executable by the processor to receive point cloud data. The instructions further include instructions to generate a plurality of feature maps based on the point cloud data, each feature map of the plurality of feature maps corresponding to a parameter of the point cloud data. The instructions further include instructions to aggregate the plurality of feature maps into an aggregated feature map. The instructions further include instructions to generate, via a feedforward neural network, at least one of a segmentation output or a classification output based on the aggregated feature map.

In other features, the feedforward neural network comprises a multilayer perceptron.

In other features, the instructions further include instructions to operate a vehicle based on at least one of the segmentation output or the classification output.

In other features, the point cloud data comprises radar point cloud data provided by a vehicle radar sensor.

In other features, the radar point cloud data comprises radar point cloud data corresponding to a single radar cycle.

In other features, the instructions further include instructions to apply a first sliding kernel operation to the radar point cloud data to generate a first feature map, and apply a second sliding kernel operation to the radar point cloud data to generate a second feature map, wherein the second feature map is different from the first feature map.

In other features, a kernel of a first sliding kernel operation is determined based on a physical size of a first vehicle and a kernel of a second sliding kernel operation is determined based on a physical size of a second vehicle, wherein the second vehicle is different from the first vehicle.

In other features, the instructions further include instructions to flatten the aggregated feature map; and concatenate the flattened aggregated feature map with the point cloud data.

In other features, the plurality of feature maps are aggregated into the aggregated feature map at a maximum pooling layer.

In other features, each point within the point cloud data is assigned an object label within the segmentation output by the feedforward neural network.

A method includes receiving point cloud data. The method further includes generating a plurality of feature maps based on the point cloud data, each feature map of the plurality of feature maps corresponding to a parameter of the point cloud data. The method further includes aggregating the plurality of feature maps into an aggregated feature map. The method further includes generating, via a feedforward neural network, at least one of a segmentation output or a classification output based on the aggregated feature map.

In other features, the feedforward neural network comprises a multilayer perceptron.

In other features, the method further include instructions to operate a vehicle based on at least one of the segmentation output or the classification output.

In other features, the point cloud data comprises radar point cloud data provided by a vehicle radar sensor.

In other features, the radar point cloud data comprises radar point cloud data corresponding to a single radar cycle.

In other features, the method further includes applying a first sliding kernel operation to the radar point cloud data to generate a first feature map, and applying a second sliding kernel operation to the radar point cloud data to generate a second feature map, wherein the second feature map is different from the first feature map.

In other features, a kernel of a first sliding kernel operation is determined based on a physical size of a first vehicle and a kernel of a second sliding kernel operation is determined based on a physical size of a second vehicle, wherein the second vehicle is different from the first vehicle.

In other features, the method further includes flattening the aggregated feature map, and concatenating the flattened aggregated feature map with the point cloud data.

In other features, the plurality of feature maps are aggregated into the aggregated feature map at a maximum pooling layer.

In other features, each point within the point cloud data is assigned an object label within the segmentation output by the feedforward neural network.

Automotive radars can be used for Advanced driver-assistance systems (ADAS) applications, such as adaptive cruise control (ACC), cross traffic alert (CTA), etc. The present disclosure is directed to a system and a method that uses one or more neural networks for radar classification and/or radar point cloud segmentation output that can be used to recognize objects, such as motorcycles or other vehicles. One or more vehicle control systems may use the radar classification and/or radar point cloud segmentation to control one or more vehicle operations, such as modifying a vehicle speed, performing a vehicle maneuver, and the like.

Figure 1:
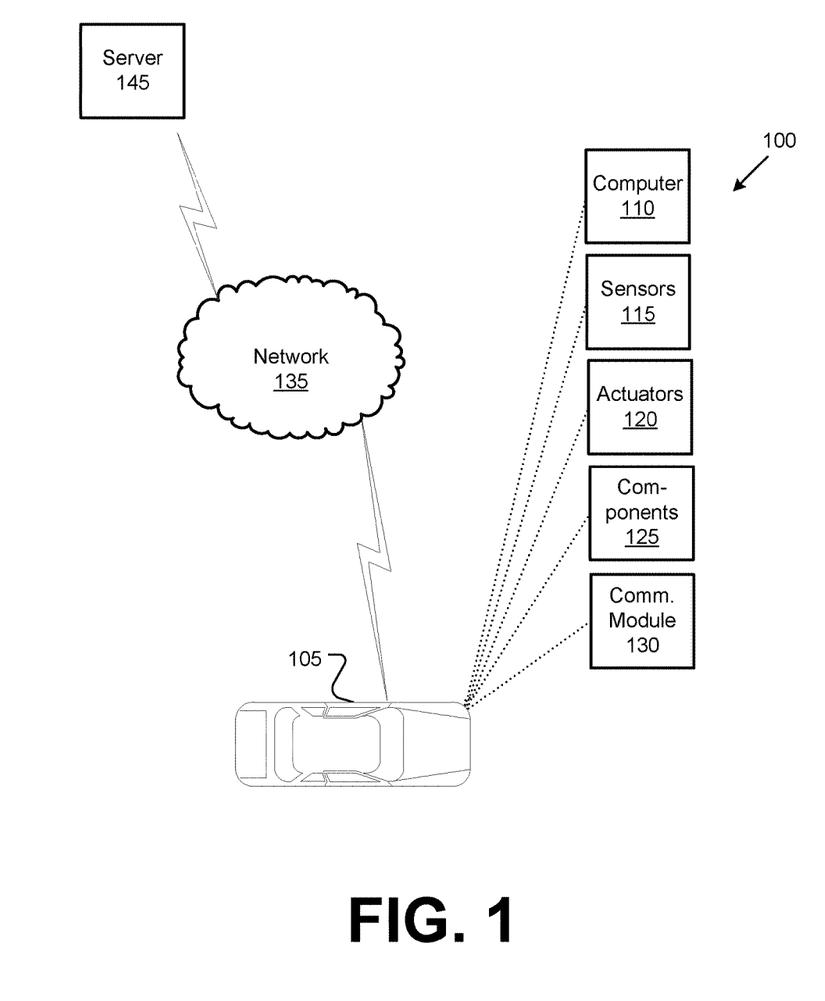
FIG. 1 is a block diagram illustrating an example vehicle control system for a vehicle.

FIG. 1 illustrates an example vehicle control system 100 that includes a vehicle computer 110 that is programmed to receive a point cloud data as input and classifies and/or segments the point cloud data. The point cloud data may be based on measurements of a sensor 115. In an example implementation, the sensor 115 comprises a radar that that provides radar point cloud data to the computer 110. In some implementations, the radar point cloud data corresponds to data from a single radar cycle. In some implementations, the radar point cloud data corresponds to data from a multiple radar cycle. As described in greater detail herein, the computer 110 classifies a cluster of radar points within the radar point cloud and/or segments the radar point cloud, e.g., classifies radar points into a class.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a server 140 and/or a user device 145, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a server 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a pole, a sign, a curb, a bicycle, a tree, a shrub, etc., relative to the vehicle 105. As one example, the data may be image data of the environment around the vehicle 105. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC, etc.) to another vehicle, and/or to other computers (typically via direct radio frequency communications). The communications module 130 could include one or more mechanisms, such as a transceiver, by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the server 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

A server 140 is a computer that is external to, and typically geographically remote from a vehicle 105. The server 140 includes a second processor and a second memory such as are known. The second memory includes one or more forms of computer-readable media, and stores instructions executable by the second processor for performing various operations, including as described herein. For example, the server 140 may be a cloud-based server. Further, the server 140 can be accessed via the network 135, e.g., the Internet or some other wide area network.

Figure 2:
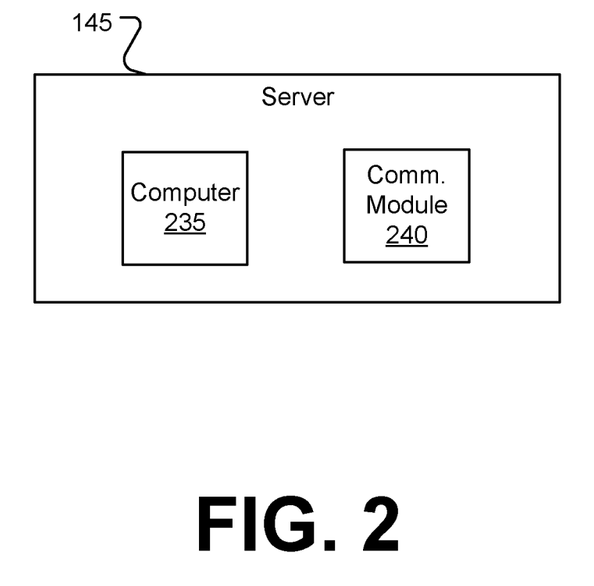
FIG. 2 is a diagram of an example server within the system.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3:
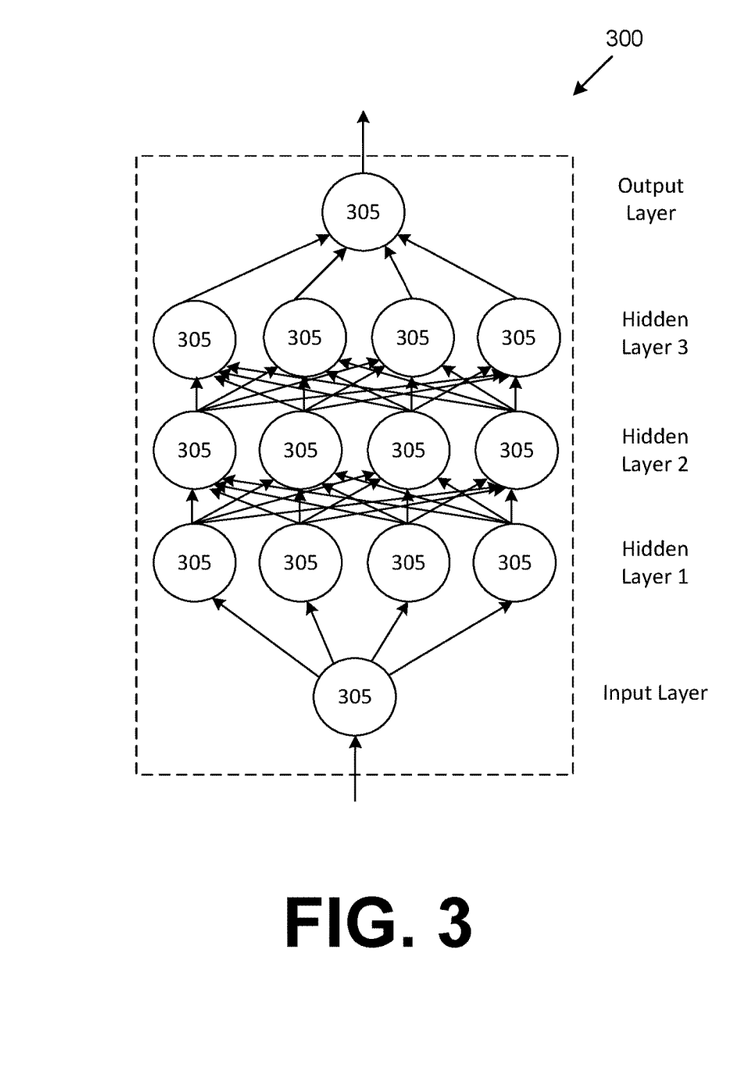
FIG. 3 is a diagram of an example deep neural network.

FIG. 3 is a diagram of an example deep neural network (DNN) 300. The DNN 300 may be representative of the neural networks described herein. The DNN 300 includes multiple nodes 305, and the nodes 305 are arranged so that the DNN 300 includes an input layer, one or more hidden layers, and an output layer. Each layer of the DNN 400 can include a plurality of nodes 305. While FIG. 3 illustrates three (3) hidden layers, it is understood that the DNN 300 can include additional or fewer hidden layers. The input and output layers may also include more than one (1) node 305.

The nodes 305 are sometimes referred to as artificial neurons 305, because they are designed to emulate biological, e.g., human, neurons. A set of inputs (represented by the arrows) to each neuron 305 are each multiplied by respective weights. The weighted inputs can then be summed in an input function to provide, possibly adjusted by a bias, a net input. The net input can then be provided to activation function, which in turn provides a connected neuron 305 an output. The activation function can be a variety of suitable functions, typically selected based on empirical analysis. As illustrated by the arrows in FIG. 3, neuron 305 outputs can then be provided for inclusion in a set of inputs to one or more neurons 305 in a next layer.

The DNN 300 can be trained to accept data as input and generate an output based on the input. The DNN 300 can be trained with ground truth data, i.e., data about a real-world condition or state. For example, the DNN 300 can be trained with ground truth data or updated with additional data by a processor. Weights can be initialized by using a Gaussian distribution, for example, and a bias for each node 305 can be set to zero. Training the DNN 300 can including updating weights and biases via suitable techniques such as back-propagation with optimizations. Ground truth data can include, but is not limited to, data classifying and/or identifying objects within a point cloud.

Figure 4:
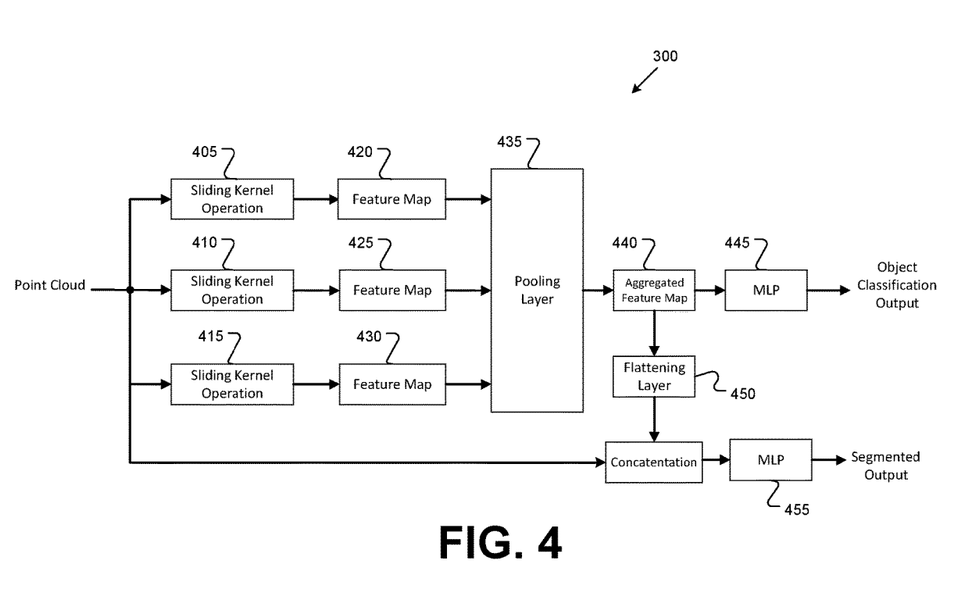
FIG. 4 is a block diagram of the deep neural network.

FIG. 4 illustrates an example DNN 300 according to an example implementation of the present disclosure. The DNN 300 receives the point cloud data, such as the radar point cloud data. One or more sliding kernel operations are performed on the point cloud data. FIG. 4 illustrates three (3) different sliding kernel operations 405, 410, 415 being performed on the point cloud data to produce three (3) corresponding feature maps 420, 425, 430. The sliding kernel operations 405, 410, 415 represent filters that are applied across the point cloud data to extract specific features from the point cloud data, and the feature maps 420, 425, 430 represent various features extracted via the respective sliding kernel operations 405, 410, 415. For example, the sliding kernel operations 405, 410, 415 may represent an operation in which the cloud point data is processed based on weighted values and an output value, e.g., features, is obtained by multiplying cloud point data by the weighted values and adding up the total multiplied values. In an example implementation, the sliding kernel operation 405 may filter features of the radar point cloud corresponding to a location parameter, the sliding kernel operation 410 may filter features of the radar point cloud corresponding to a radar cross-section (RCS) parameter, and the sliding kernel operation 415 may filter features of the radar point cloud corresponding to a Doppler parameter. While only three (3) sliding kernel operations and feature maps are illustrated, it is understood that the DNN 300 may include additional or fewer sliding kernel operations and feature maps. The kernel of the sliding kernel operation 405, 410, 415 is based on a physical size of an object of interest. In an example implementation, the various kernels of the sliding kernel operation 405, 410, 415 are based on the physical size of a vehicle of interest to be detected by the radar sensor 115. For example, a kernel of a first sliding kernel operation may be determined based on the physical size of a motorcycle, and a kernel of a second sliding kernel operation may be determined based on the physical size of a sedan or a bus.

The feature maps 420, 425, 430 are provided to a pooling layer 435. The pooling layer 435 can perform a down-sampling operation on the received feature maps 420, 425, 430. For example, the pooling layer 435 may comprise a maximum pooling (max pooling) layer that performs the down-sampling operation by dividing the input into rectangular pooling regions and computes the maximum value of each region to produce an aggregated feature map 440. The pooling layer 435 can be applied on all the received feature maps 420, 425, 430 to generate the aggregated feature map 440.

The aggregated feature map 440 can be provided to a first multilayer feedforward network (FNN) 445 for object classification. The first FNN 445 may be a trained FNN that is programmed to output an object classification based on the aggregated feature map 440. For example, based on the features within the aggregated feature map 440, the first FNN 445 classifies one or more objects detected by one or more radar sensors 115. For instance the first FNN 445 may classify a detected object as a particular type of vehicle, such as a motorcycle, a sedan, a bus, or the like.

The aggregated feature map 440 can also be provided to a flattening layer 450. The flattening layer 450 transforms the aggregated feature map 440, in matrix form, to a single column of values for processing purposes. The point cloud data can be concatenated with the flattened aggregated feature map data to form a concatenated vector including the flattened aggregated feature map data and the point cloud data. The concatenated vector is provided as input to a second FNN 455 that outputs segmented point cloud data. For example, each point with the point cloud may be classified into a class of objects, e.g., semantic segmentation, detected by the radar sensor 115. For instance, each radar point may assigned to an object label. In one or more implementations, the FNNs 445, 455 comprise multilayer perceptrons (MLPs).

Figure 5:
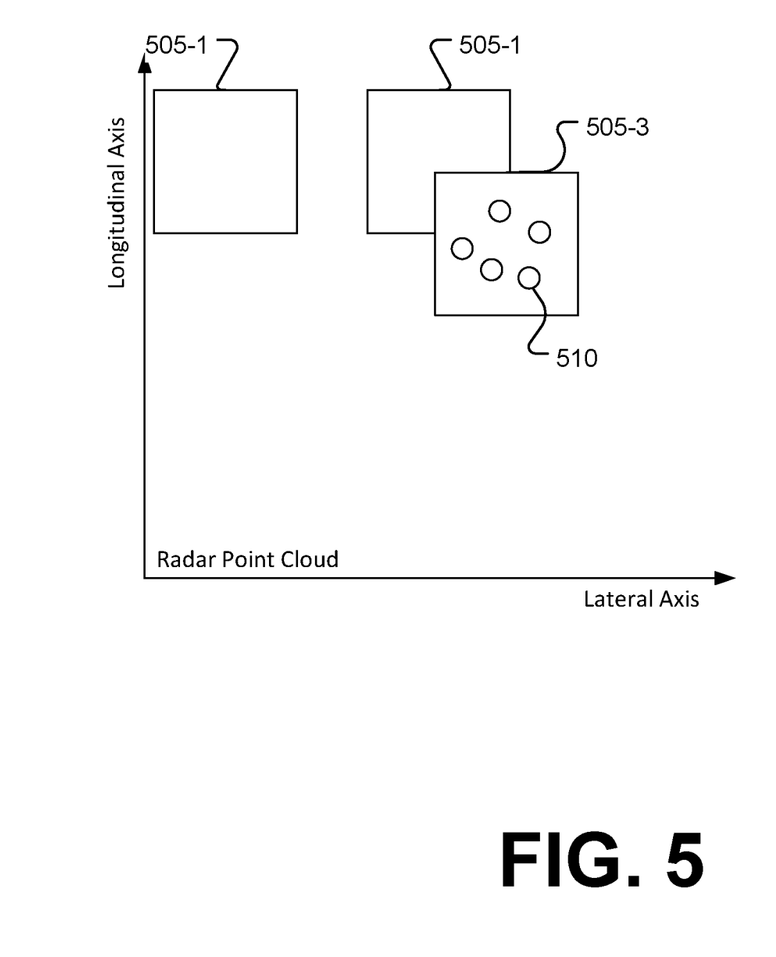
FIG. 5 is a diagram illustrating an example sliding kernel operation of the deep neural network.

FIG. 5 illustrates an example sliding kernel operation according to the present disclosure. A kernel 505-1, e.g., a filter, begins at a 0-th position of the received point cloud data and strides, e.g., moves, horizontally and vertically through the point cloud data. The horizontal and vertical strides of the kernel 505 is determined by the range (longitudinal) and cross-range (resolution) of the radar sensor 115 used by the vehicle 105. The kernel 505-2 represents a position of the kernel 505-2 at position i, where i is an integer, and the kernel 505-3 represents a position of the kernel 505-3 at a position j, where j is an integer different that i. The point 510 represents a point within the point cloud data. In one or more example implementations, the point 510 may represent a radar point measured by the radar sensor 115. In this implementation, the radar point 510 may represent a parameter associated with the radar point 510. The parameter may comprise at least one of a location parameter, a radar cross-section (RCS) parameter, and/or a Doppler parameter.

Figure 6:
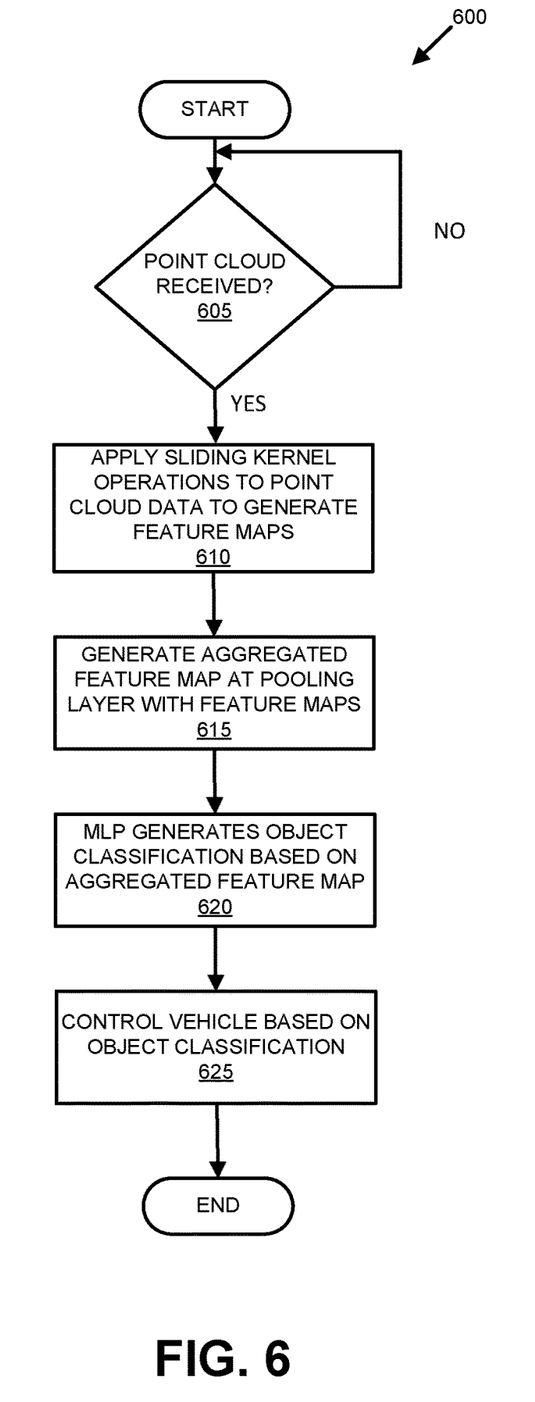
FIG. 6 is a flow diagram illustrating an example process for generating an object classification based on point cloud data.

FIG. 6 is a flowchart of an exemplary process 600 for generating an output indicative of an object classification. Blocks of the process 600 can be executed by the computer 110 or the computer 235. The process 600 begins at block 605 in which a determination of whether point cloud data is received. In an example implementation, the DNN 300 receives a radar point cloud from a radar sensor 115. If the radar point cloud has not been received, the process 600 returns to block 605.

Otherwise, at block 610, one or more sliding kernel operations 405, 410, 415 are applied to the point cloud data to generate corresponding feature maps 420, 425, 430. The sliding kernel operations 405, 410, 415 can be applied to the point cloud data in parallel to generate feature maps 420, 425, 430. For example, different sliding kernel operations 405, 410, 415 are applied to the radar point cloud data on a per radar cycle data basis. At block 615, the feature maps 420, 425, 430 are provided to a pooling layer 440 to generate an aggregated feature map. The aggregated feature map is provided to a first trained MLP 445 for object classification at block 620. At block 625, the computer 110 controls one or more operations of the vehicle 105 based on the object classification.

Figure 7:
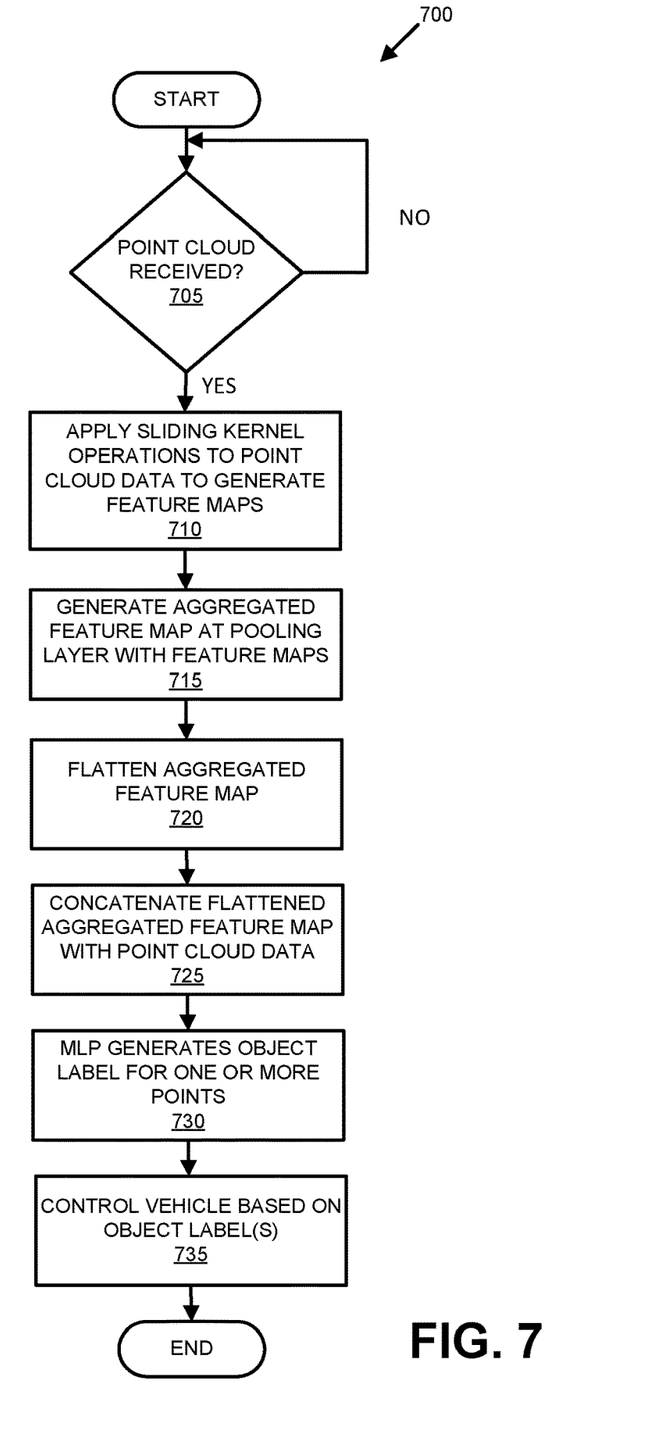
FIG. 7 is a flow diagram illustrating an example process for generating a semantic output based on point cloud data.

FIG. 7 is a flowchart of an exemplary process 700 for generating a class label for one or more points within a point cloud. Blocks of the process 700 can be executed by the computer 110 or the computer 235. The process 700 begins at block 705 in which a determination of whether point cloud data is received. In an example implementation, the DNN 300 receives a radar point cloud from a radar sensor 115. If the radar point cloud has not been received, the process 700 returns to block 605.

Otherwise, at block 710, one or more sliding kernel operations 405, 410, 415 are applied to the point cloud data to generate corresponding feature maps 420, 425, 430. At block 715, the feature maps are provided to a pooling layer 435 to generate an aggregated feature map. The aggregated feature map is flattened at a flattening layer 450 at block 720. At block 725, the flattened point cloud data is concatenated with the flattened aggregated feature map data to form a concatenated vector. At block 730, a second MLP 455 determines an object label for each point within the point cloud. At block 735, the computer 110 controls one or more operations of the vehicle 105 based on the object label(s).

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. The adjectives "first" and "second" are used throughout this document as identifiers and are not intended to signify importance or order. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
   receive radar point cloud data;
   generate a plurality of feature maps based on the radar point cloud data, each feature map of the plurality of feature maps corresponding to a parameter of the radar point cloud data that includes a radar cross-section (RCS) parameter and/or a Doppler parameter;
   aggregate the plurality of feature maps into an aggregated feature map; and
   generate, via a feedforward neural network, at least one of a segmentation output or a classification output based on the aggregated feature map.

2. The system of claim 1, wherein the feedforward neural network comprises a multilayer perceptron.

3. The system of claim 1, wherein the instructions further include instructions to operate a vehicle based on at least one of the segmentation output or the classification output.

4. The system of claim 1, wherein the point cloud data comprises radar point cloud data provided by a vehicle radar sensor.

5. The system of claim 1, wherein the radar point cloud data comprises radar point cloud data corresponding to a single radar cycle.

6. The system of claim 5, wherein the instructions further include instructions to apply a first sliding kernel operation to the radar point cloud data to generate a first feature map; and apply a second sliding kernel operation to the radar point cloud data to generate a second feature map, wherein the second feature map is different from the first feature map.

7. The system of claim 6, wherein a kernel of a first sliding kernel operation is determined based on a physical size of a first vehicle and a kernel of a second sliding kernel operation is determined based on a physical size of a second vehicle, wherein the second vehicle is different from the first vehicle.

8. The system of claim 1, wherein the instructions further include instructions to flatten the aggregated feature map; and concatenate the flattened aggregated feature map with the point cloud data.

9. The system of claim 1, wherein the plurality of feature maps are aggregated into the aggregated feature map at a maximum pooling layer.

10. The system of claim 1, wherein each point within the point cloud data is assigned an object label within the segmentation output by the feedforward neural network.

11. A method comprising,
    receiving point cloud data;
    generating a plurality of feature maps based on the radar point cloud data, each feature map of the plurality of feature maps corresponding to a parameter of the radar point cloud data that includes a radar cross-section (RCS) parameter and/or a Doppler parameter;

aggregating the plurality of feature maps into an aggregated feature map; and
generating, via a feedforward neural network, at least one of a segmentation output or a classification output based on the aggregated feature map.

12. The method of claim 11, wherein the feedforward neural network comprises a multilayer perceptron.

13. The method of claim 11, the method further comprising operating a vehicle based on at least one of the segmentation output or the classification output.

14. The method of claim 11, wherein the point cloud data comprises radar point cloud data provided by a vehicle radar sensor.

15. The method of claim 14, wherein the radar point cloud data comprises radar point cloud data corresponding to a single radar cycle.

16. The method of claim 15, the method further comprising applying a first sliding kernel operation to the radar point cloud data to generate a first feature map; and applying a second sliding kernel operation to the radar point cloud data to generate a second feature map, wherein the second feature map is different from the first feature map.

17. The method of claim 16, wherein a kernel of a first sliding kernel operation is determined based on a physical size of a first vehicle and a kernel of a second sliding kernel operation is determined based on a physical size of a second vehicle, wherein the second vehicle is different from the first vehicle.

18. The method of claim 11, the method further comprising flattening the aggregated feature map; and concatenating the flattened aggregated feature map with the point cloud data.

19. The method of claim 11, wherein the plurality of feature maps are aggregated into the aggregated feature map at a maximum pooling layer.

20. The method of claim 11, wherein each point within the point cloud data is assigned an object label within the segmentation output.

\* \* \* \* \*